United States Patent
Sun et al.

(10) Patent No.: US 11,275,230 B2
(45) Date of Patent: Mar. 15, 2022

(54) DETECTION APPARATUS, DETECTION METHOD, DETECTION PROGRAM, AND IMAGING APPARATUS

(71) Applicant: Sony Group Corporation, Tokyo (JP)

(72) Inventors: Legong Sun, Tokyo (JP); Seijiro Inaba, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 31 days.

(21) Appl. No.: 15/741,307

(22) PCT Filed: Jun. 27, 2016

(86) PCT No.: PCT/JP2016/003087
§ 371 (c)(1),
(2) Date: Jan. 2, 2018

(87) PCT Pub. No.: WO2017/037978
PCT Pub. Date: Mar. 9, 2017

(65) Prior Publication Data
US 2018/0196221 A1    Jul. 12, 2018

(30) Foreign Application Priority Data
Aug. 31, 2015 (JP) .............................. JP2015-171165

(51) Int. Cl.
*G02B 7/34* (2021.01)
*G03B 13/36* (2021.01)
(Continued)

(52) U.S. Cl.
CPC ................. *G02B 7/34* (2013.01); *G02B 7/28* (2013.01); *G03B 13/20* (2013.01); *G03B 13/36* (2013.01);
(Continued)

(58) Field of Classification Search
CPC . G02B 7/34; G02B 7/28; H04N 5/232; H04N 5/23212
See application file for complete search history.

(56) References Cited

U.S. PATENT DOCUMENTS

2012/0314116 A1* 12/2012 Jannard ................. G03B 13/18
348/333.02
2013/0307993 A1* 11/2013 Kawarada .......... H04N 5/23212
348/169
(Continued)

FOREIGN PATENT DOCUMENTS

CN          102377938 A      3/2012
JP          2012-128343 A    7/2012
(Continued)

OTHER PUBLICATIONS

Partial Supplementary European Search Report with Communication Pursuant to Rule 164(1)EPC for corresponding European Application No. 16841025.6.
(Continued)

*Primary Examiner* — Antoinette T Spinks
(74) *Attorney, Agent, or Firm* — Michael Best & Friedrich LLP

(57) ABSTRACT

A detection apparatus has a detector for detecting, on the basis of an object area that is an area corresponding to an object in an image, an effective focus area from two or more focus areas set to the image.

20 Claims, 16 Drawing Sheets

(51) Int. Cl.
 *G02B 7/28* (2021.01)
 *G03B 17/18* (2021.01)
 *G03B 15/00* (2021.01)
 *H04N 5/232* (2006.01)
 *G06T 7/571* (2017.01)
 *G03B 13/20* (2021.01)

(52) U.S. Cl.
 CPC ............ *G03B 15/00* (2013.01); *G03B 17/18* (2013.01); *G06T 7/571* (2017.01); *H04N 5/23218* (2018.08); *H04N 5/23219* (2013.01); *H04N 5/232127* (2018.08); *H04N 5/232945* (2018.08)

(56) References Cited

U.S. PATENT DOCUMENTS

| 2014/0176783 | A1* | 6/2014 | Shibagami | H04N 5/23212 |
| | | | | 348/349 |
| 2015/0062175 | A1 | 3/2015 | Kim | |
| 2015/0138429 | A1 | 5/2015 | Ogura et al. | |

FOREIGN PATENT DOCUMENTS

| JP | 2013-037246 | A | | 2/2013 |
| JP | 2013242408 | A | * | 12/2013 |
| JP | 2014-202875 | A | | 10/2014 |
| WO | 2015/141081 | A1 | | 9/2015 |

OTHER PUBLICATIONS

Extended European Search Report dated Jun. 26, 2019 for corresponding European Application No. 16841025.6.
European Patent Office Communication Pursuant to Article 94(3) dated Feb. 20, 2020 for corresponding Europear Application No. 16841025.6.
Chinese Office Action dated Mar. 23, 2020 for corresponding Chinese Application No. 201680038512.4.
Japanese Office Action dated Jul. 7, 2020 for corresponding Japanese Application No. 2017-537193.

* cited by examiner

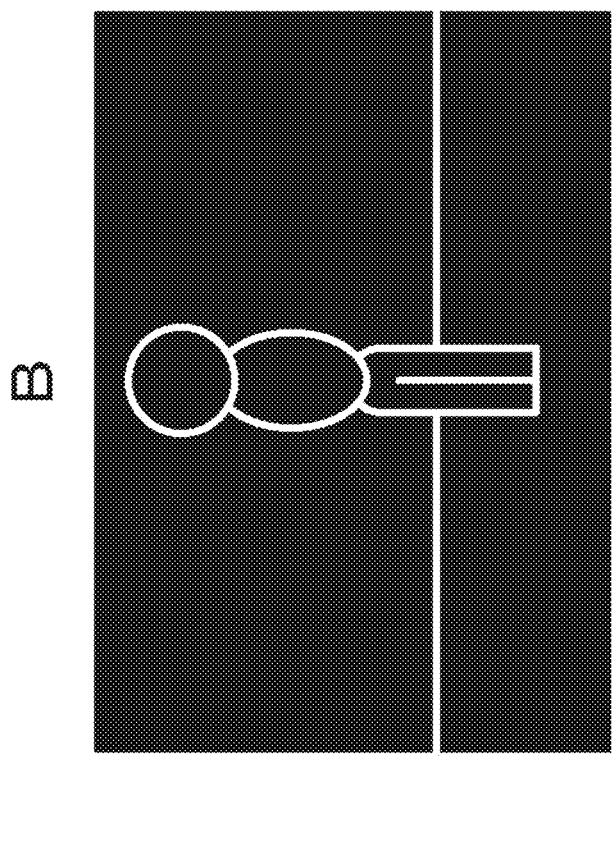
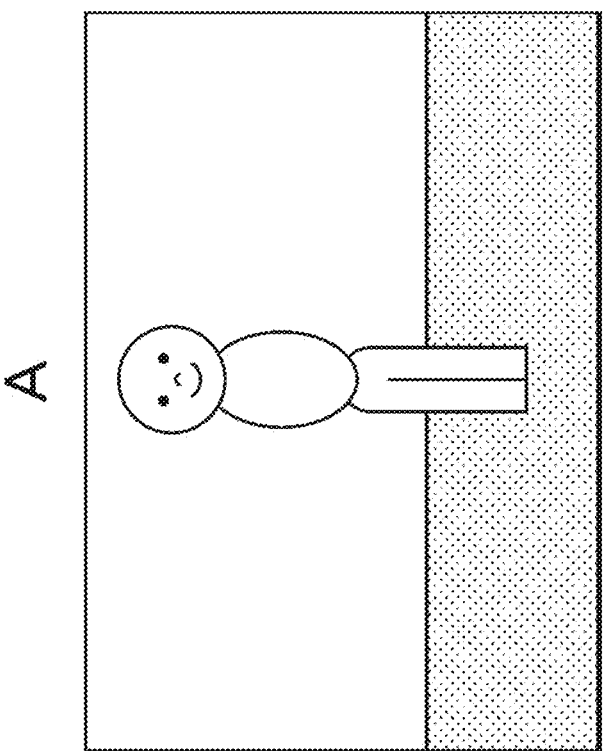
FIG. 6

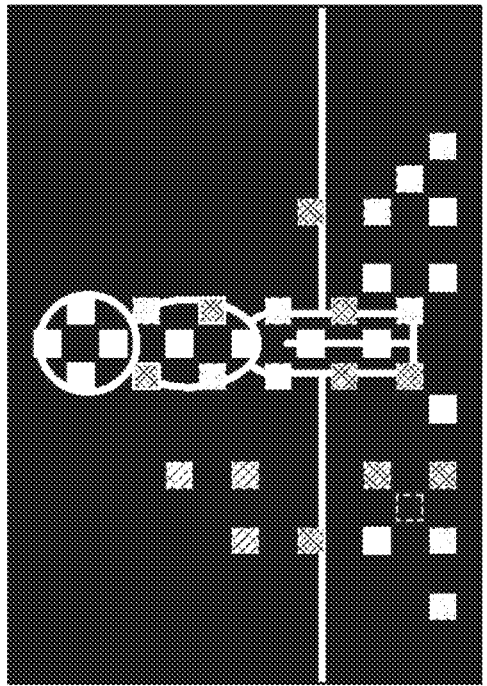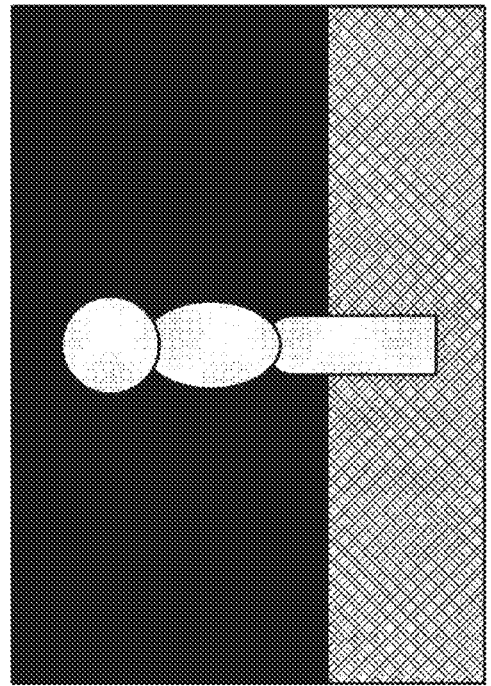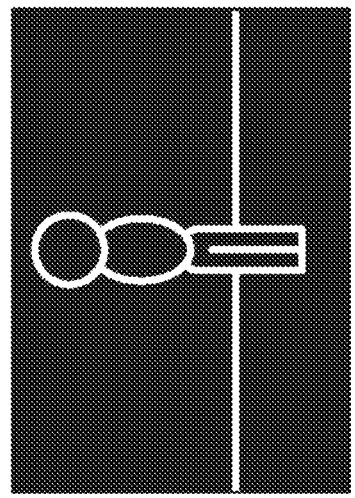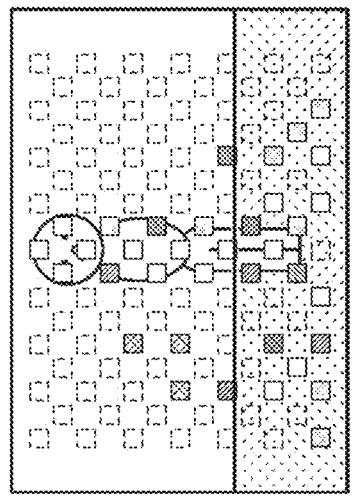
FIG. 7

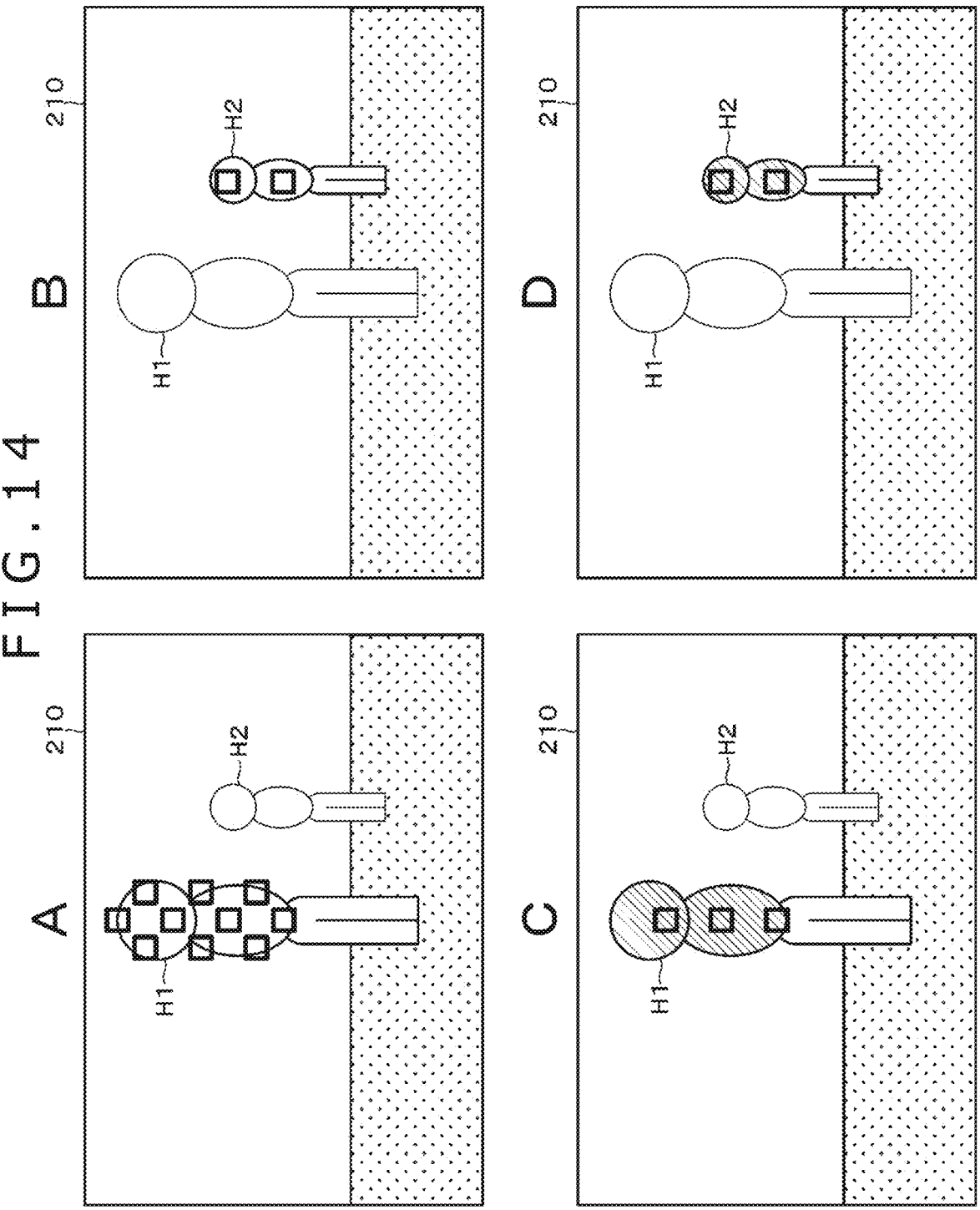

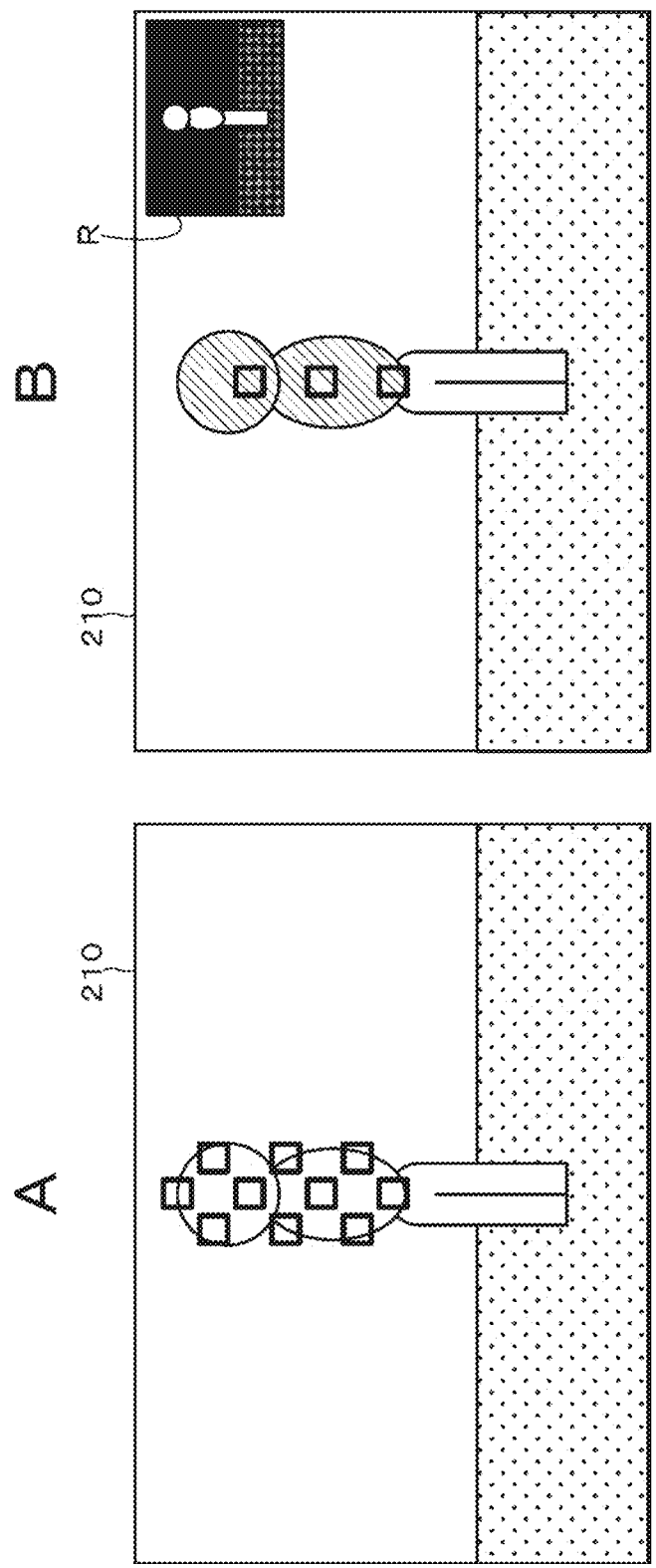

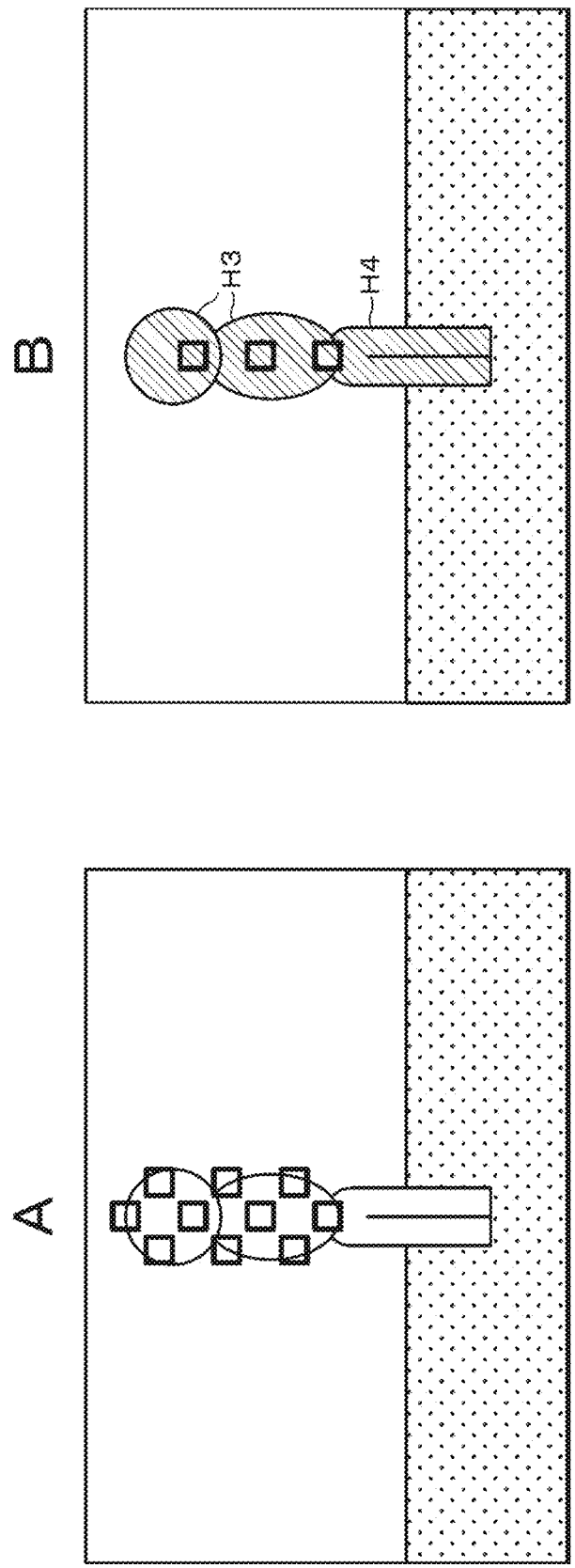

DETECTION APPARATUS, DETECTION METHOD, DETECTION PROGRAM, AND IMAGING APPARATUS

TECHNICAL FIELD

The present technique relates to a detection apparatus, a detection method, a detection program, and an imaging apparatus.

BACKGROUND ART

Some of imaging apparatuses such as digital cameras have two or more AF (Auto Focus) areas for auto focusing based on phase difference detecting, for example, so as to detect the focusing of an object in each of these AF areas (refer to PTL 1 below).

CITATION LIST

Patent Literature

[PTL 1]
JP 2014-202875A

SUMMARY

Technical Problem

If there are two or more objects different in distance in an AF area, there occurs a problem that an object not desired by a user may be focused or the approximate center position between these two or more objects may be focused in that AF area, leaving an object desired by the user out of focus. Such an AF area in which there are two or more object having different distances cannot be said to be an effective AF area in auto focusing, for example.

Therefore, the present technique addresses the above-mentioned problem and solves, as one objective thereof, the same by providing a detection apparatus, a detection method, a detection program, and an imaging apparatus that are configured to detect an effective AF area from among two or more AF areas.

Solution to Problem

In carrying out the technique and according to a first aspect thereof, there is provided a detection apparatus. This detection apparatus has a detector configured to detect, on the basis of an object area that is an area corresponding to an object in an image, an effective focus area from a plurality of focus areas set to that image.

Further, in carrying out the technique and according to a second aspect thereof, there is provided a detection method. This detection method includes detecting, on the basis of an object area that is an area corresponding to an object in an image, an effective focus area from a plurality of focus areas set to that image.

Further, in carrying out the technique and according to a third aspect thereof, there is provided a detection program for a computer to execute a detection method. This detection method includes detecting, on the basis of an object area that is an area corresponding to an object in an image, an effective focus area from a plurality of focus areas set to that image.

In carrying out the technique and according to a fourth aspect thereof, there is provided an imaging apparatus. This imaging apparatus has a detector having an image pickup element configured to take an image; and a detector configured to detect, on the basis of an object area that is an area corresponding to an object in an image to be taken with the image pickup element, an effective focus area from a plurality of focus areas arranged on that image.

Advantageous Effect of Invention

According to the present technique, an effective focus area can be detected from among two or more focus areas. It should be noted that the effects described here are not necessarily limited thereto; namely, any other effects described herein may be included in the advantageous effects of the invention.

BRIEF DESCRIPTION OF DRAWINGS

FIG. 6A is a diagram illustrating an image subject to processing and FIG. 6B is diagram illustrating an object area detected from an image.
FIG. 7 is a diagram describing depth information generation processing.
FIG. 14A and FIG. 14B are comparison examples of display mode and FIG. 14C and FIG. 14D are second examples of display modes using focus area detection information.
FIG. 15A is a comparison example of display mode and FIG. 15B is a third example of a display mode using focus area detection information.
FIG. 16A is a comparison example of display mode and FIG. 16B is a fourth example of a display mode using focus area detection information.

DESCRIPTION OF EMBODIMENTS

The following describes embodiments of the present technique with reference to drawings. It should be noted that the description will be done in the following order:
1. Embodiments
1-1. Configuration of detection apparatus
1-2. Configuration of imaging apparatus
1-3. Detection processing
1-4. Use of focus area detection information
1-5. Display processing
2. Variations

1. Embodiments

1-1. Configuration of Detection Apparatus

Figure 1:
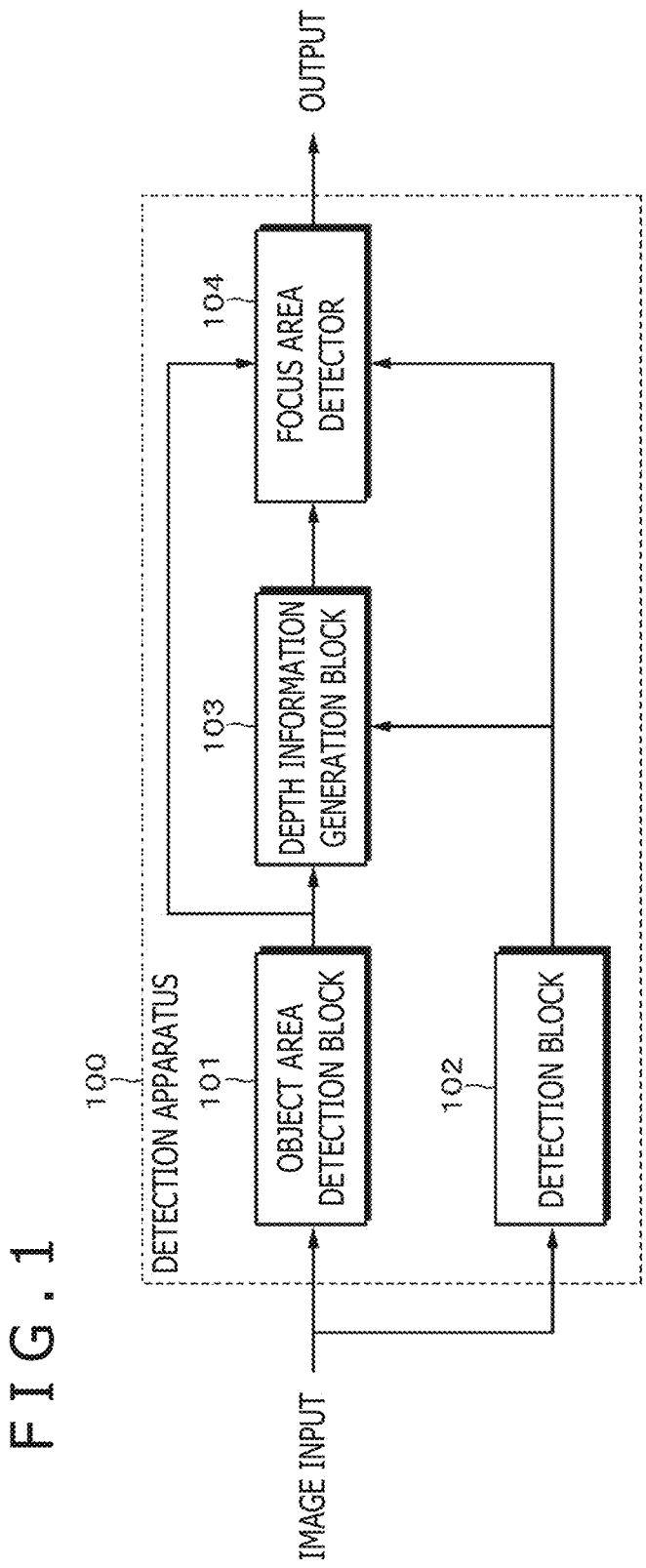
FIG. 1 is a block diagram illustrating a configuration of a detection apparatus.

First, referring to FIG. 1, a configuration of a detection apparatus 100 related with the present technique is described. FIG. 1 is a block diagram illustrating the configuration of the detection apparatus 100.

The detection apparatus 100 is configured by an object area detection block 101, a detection block 102, a depth information generation block 103, and a focus area detector 104.

The object area detection block 101 detects an area (hereafter referred to as an object area) corresponding to an object in an input image. Details of the detection of an object area will be described later. Information indicative of a detected object area (hereafter referred to as object area information) is supplied to the depth information generation block 103 and the focus area detector 104. An input image is, for example, an image obtained by the imaging by an imaging apparatus 200 having the detection apparatus 100.

The detection block 102 detects a state of focusing (or a degree of focusing) on an object in each focus area that is a detection range for auto focus for an input image so as to obtain defocus information indicative of shifts from focus in all focus areas. In other words, the detection block 102 computes defocus information indicative of shifts from focus in all of two or more focus areas on the basis of a phase difference detection signal for each focus area obtained through an AF sensor on an imaging apparatus. The defocus information for each focus area is supplied to the depth information generation block 103 and the focus area detector 104. Further, information (hereafter referred to as focus area positional information) indicative of the positions and sizes of all focus areas is supplied from the detection block 102 to the focus area detector 104.

The depth information generation block 103 generates depth information that is a value for each object area of defocus information in an input image on the basis of the object area information and the defocus information. Details of the depth information will be described later. The generated depth information is supplied to the focus area detector 104.

On the basis of the object area information, the depth information, and the focus area positional information, the focus area detector 104 detects a focus area (hereafter referred to as an effective focus area) in which no two or more objects having different distances exist from among all of the focus areas. The focus area detection information indicative of a detected effective focus area is outputted to the outside. The focus area detector 104 is equivalent to a detector cited in the scope of claims herein.

Figure 2:
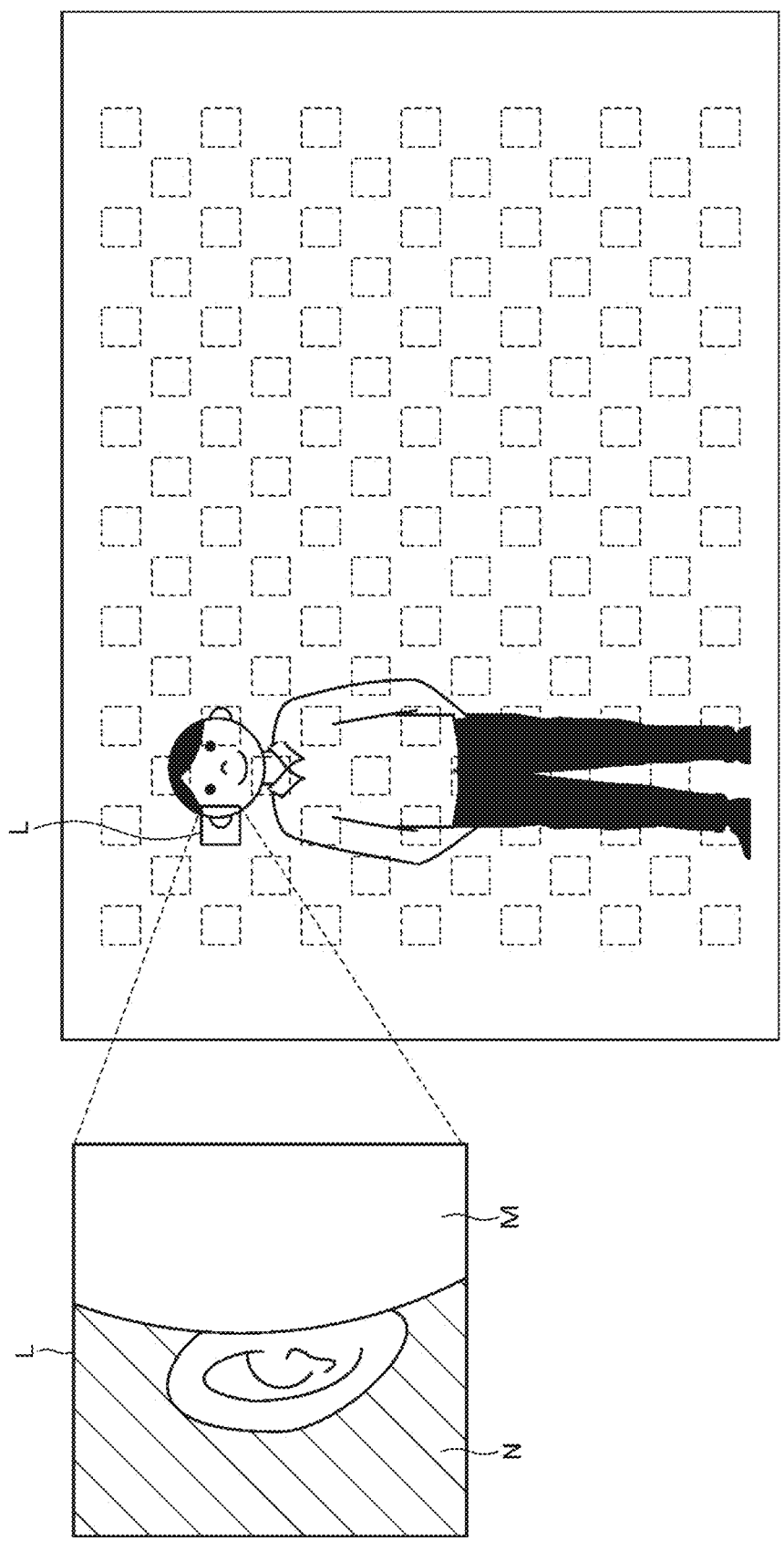
FIG. 2 is a diagram describing effective focus areas.

The detection apparatus 100 detects, from among two or more focus areas, a focus area in which two or more objects having different distances do not exist as an effective focus area. In the example depicted in FIG. 2, many focus areas are arranged as depicted by dashed line frames on a monitoring image. In a focus area L, one of these many focus areas, there are two objects having different distances; an object M that is part of the face of a person positioned on the near side and an object N that is the background on the far side. Therefore, this focus area L is an ineffective focus area, rather than an effective focus area. The detection apparatus 100 detects, as an effective focus area, such a focus area other than ineffective focus areas. The information indicative of detected effective focus area and so on is supplied as the focus area detection information to the outside, an imaging apparatus having the detection apparatus 100, for example. It should be noted that "distances" in "two or more objects having different distances" may be any distances from an AF sensor of the imaging apparatus 200 that takes images and has a function as the detection apparatus 100, a particular position of the housing of the imaging apparatus 200, the lens of the imaging apparatus 200, or an image taking person.

The detection apparatus 100 is configured as described above. The detection apparatus 100 is used on an imaging apparatus, for example.

The detection apparatus 100 is configured by programs that may be installed on an imaging apparatus in advance distributed by downloading or in a storage medium to be installed by a user. A control block of the imaging apparatus executes these programs to have the control block function as the detection apparatus 100. It should be noted that the detection apparatus 100 is realized not only by programs but also combinations of a dedicated hardware apparatus or a hardware circuit that have the functions of these programs.

1-2. Configuration of Imaging Apparatus

Figure 3:
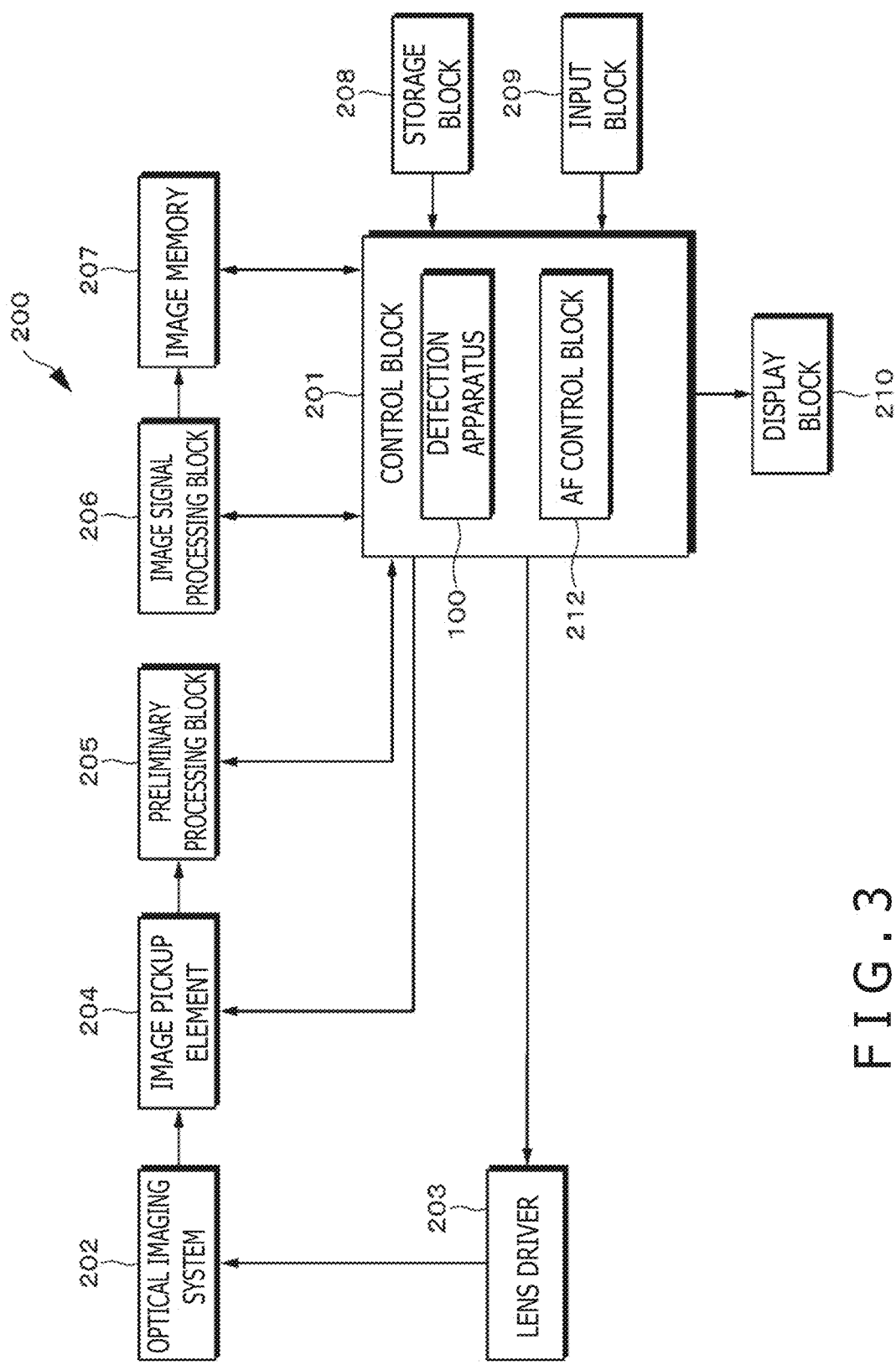
FIG. 3 is a block diagram illustrating a configuration of an imaging apparatus.

The following describes a configuration of the imaging apparatus 200 having functions of the detection apparatus 100 related with the present embodiment. Referring to FIG. 3, there is depicted a block diagram illustrating a configuration of the imaging apparatus 200.

The imaging apparatus 200 is configured by having a control block 201, an optical imaging system 202, a lens driver 203, an image pickup element 204, a preliminary processing block 205, an image signal processing block 206, an image memory 207, a storage block 208, an input block 209, and a display block 210.

The control block 201 is configured by a CPU (Central Processing Unit), a RAM (Random Access Memory), and a ROM (Read Only Memory). The ROM stores programs and so on that are read by the CPU to be operated. The RAM is used for a work memory of the CPU. The CPU issues commands by executing various processing operations as instructed by programs stored in the ROM, thereby controlling the entire imaging apparatus 200. Further, the control block 201 functions as the detection apparatus 100 and an AF control block 211 by executing predetermined programs.

The optical imaging system 202 is configured by an imaging lens for collecting the light from an object onto the image pickup element 204, a drive mechanism for moving the imaging lens so as to execute focusing and zooming, a shutter mechanism, and an iris mechanism. These components are driven on the basis of control by the control block 201 and control by the lens driver 203. An optical image of an object obtained through the optical imaging system 202 is formed on the image pickup element 204 that is an imaging device.

The lens driver 203 is configured by a microcomputer or the like and controls operations of the drive mechanism, the shutter mechanism, and the iris mechanism of the optical imaging system 202 under the control of the control block 201. Consequently, the adjustment of an exposure time (or a shutter speed) and the adjustment of an aperture value (or an F number) are executed.

The image pickup element 204 photoelectrically converts an incident light from an object into an electric charge and outputs this electric charge as an analog imaging signal. The analog imaging signal outputted from the image pickup element 204 is outputted to the preliminary processing block 205. For the image pickup element 204, a CCD (Charge Coupled Device), a CMOS (Complementary Metal Oxide Semiconductor), or the like is used. It should be noted that a configuration may also be provided in which the image pickup element 204 has the function of an AF sensor.

The preliminary processing block 205 executes sample hold processing and so on in order to keep good an S/N (Signal/Noise) ratio on an imaging signal outputted from the image pickup element 204 by executing CDS (Correlated Double Sampling) processing. Further, the preliminary processing block 205 controls a gain by executing AGC (Auto Gain Control) processing so as to execute A/D (Analog/ Digital) conversion, outputting a digital image signal.

The image signal processing block 206 executes, on an image signal, predetermined signal processing such as pixelization processing, white balance adjustment processing, color correction processing, gamma correction processing, Y/C conversion processing, AE (Auto Exposure) processing, and resolution conversion processing.

The image memory 207 is a buffer memory configured by a nonvolatile memory such as a DRAM (Dynamic Random Access Memory), for example. The image memory 207 temporarily stores image data and the like processed by the image signal processing block 206 in a predetermined manner.

The storage block 208 is a mass storage medium such as a hard disc drive, a memory stick (a registered trademark of Sony Corporation), and an SD memory card, for example. Each image is stored is a state of compression done on the basis of JPEG (Joint Photographic Experts Group) standard, for example. At the same time, EXIF (Exchangeable image File Format) data including information associated with the stored image and additional information such as the date and time of imaging is stored as related with the stored image. A moving image is stored in a format such as MPEG2 (Moving Picture Experts Group2) or MPEG4, for example.

The input block 209 includes, for example, a power button for power on/off switching, a release button for giving a command of start of taken image recording, a zoom adjustment control, and a touch screen configured monolithically with the display block 210. When an input manipulation is done on the input block 209, a control signal corresponding to this input is generated to be outputted to the control block 201. Then, the control block 201 executes the computation processing and control operation in accordance with this control signal.

The display block 210 is a display device configured by an LCD (Liquid Crystal Display), a PDF (Plasma Display Panel), or an organic EL (Electro Luminescence) panel, for example. The display block 210 indicates a user interface of the imaging apparatus 200, a menu screen, a monitoring image during imaging, and a taken image and a taken moving image recorded to the storage block 208.

The AF control block 211 executes auto focus control so as to focus an object by driving the lens driver 203 on the basis of focus area detection information received from the detection apparatus 100.

The imaging apparatus 200 having the functions as the detection apparatus 100 is configured as described above.

1-3. Detection Processing

Figure 4:
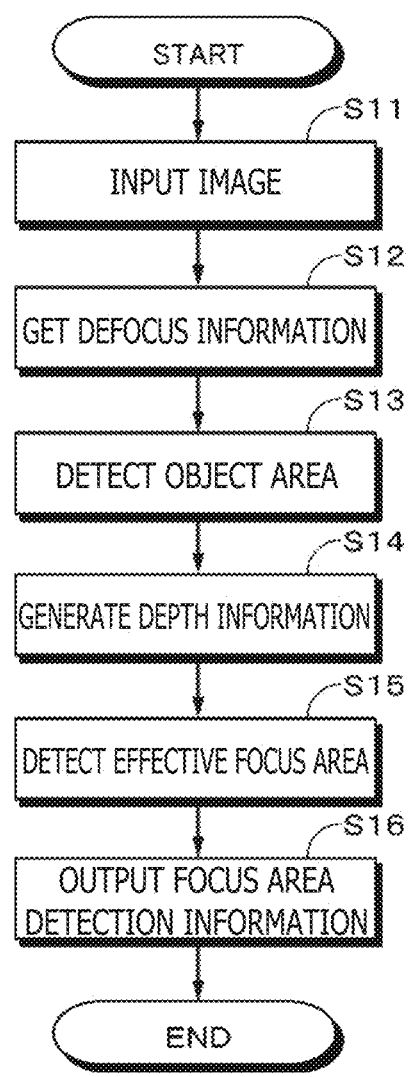
FIG. 4 is a flowchart indicative of a flow of detection processing.

The following describes the detection processing that is executed on the imaging apparatus 200 having the detection apparatus 100. Referring to FIG. 4, there is depicted a flowchart indicative of a flow of the detection processing.

First, in step S11, an image is entered in the detection apparatus 100. In the present embodiment, an input image is an image obtained by the imaging done through the imaging apparatus 200. Next, in step S12, the detection block 102 obtains the defocus information in all focus areas.

Next, in step S13, the object area detection block 101 detects an object area in the image. The object area detection block 101 can detect an object area by use of superpixels, for example.

Figure 5:
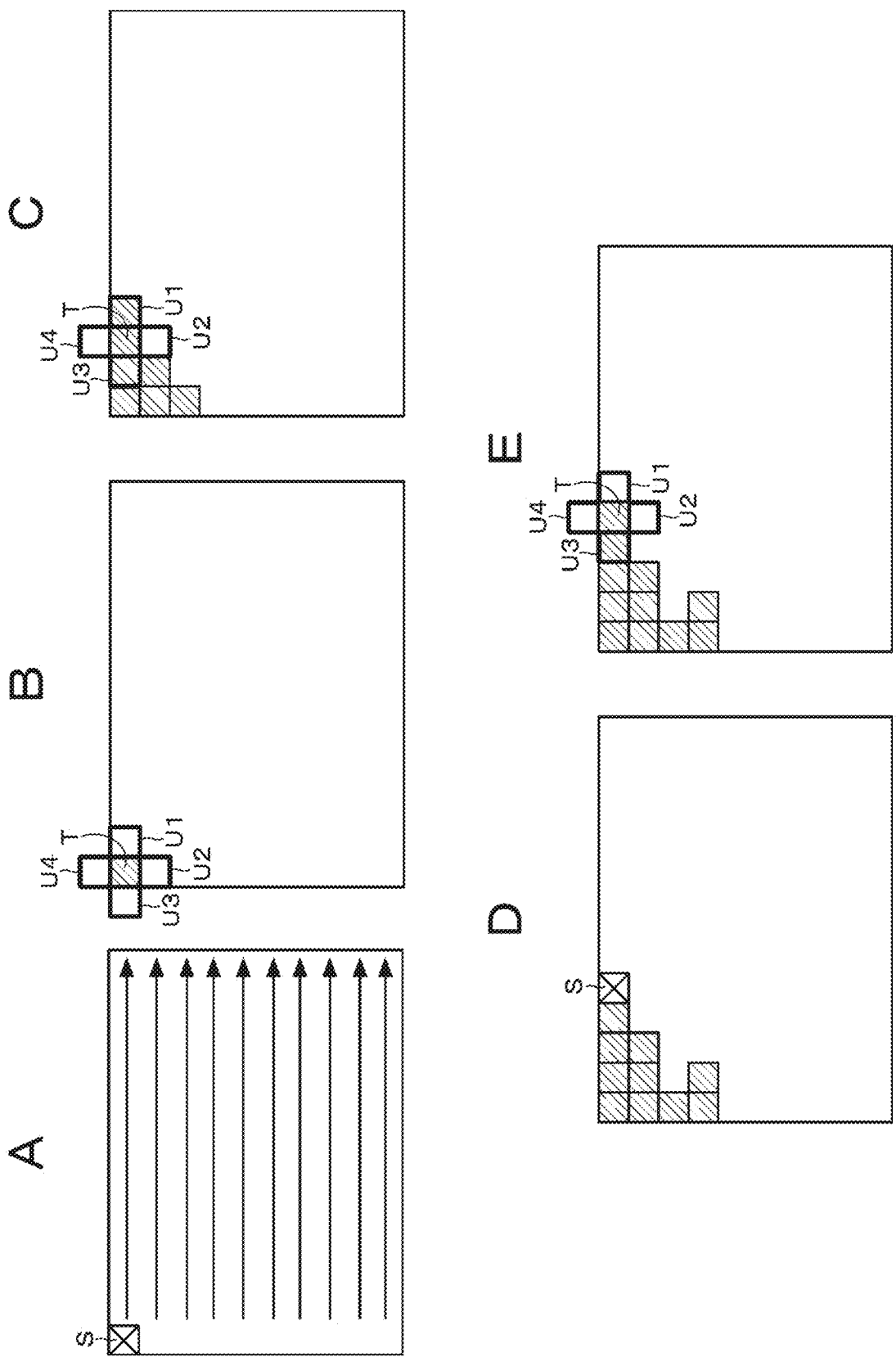
FIGS. 5A through 5E are diagrams describing object area detection processing.

The following describes an overview of the detection of an object area by use of superpixels with reference to FIG. 5. In this processing, a seed pixel S is set for an image to be processed and the seed pixel S is moved from the upper left in a raster manner for all pixels making up the image as depicted in FIG. 5A, thereby scanning all the pixels.

First, as depicted in FIG. 5B, let a pixel at the top and left-most position specified by the seed pixel S be a target pixel T and four pixels enclosed by thick lines around this target pixel T be pixels subject to processing U1, U2, U3, and U4 that are processed in this order. In the processing, a difference between an average color of all pixels determined to be included in a same object area and a color of a pixel subject to processing is compared with a predetermined threshold value; if this difference is found to be equal to or lower than this threshold value, then this pixel is determined to be included in this object area.

As depicted in FIG. 5B, if the pixel on the right of the target pixel T is the first pixel subject to processing U1, then an object area including two or more pixels is not yet formed, so that a difference between the target pixel T and the pixel subject to processing U1 is compared with a predetermined threshold value. If the difference is found to be equal to or lower than the predetermined threshold value, then this pixel subject to processing U1 is determined to be the object area. On the other hand, if the difference is found to be equal to or higher than the threshold value, then the pixel subject to processing U1 is not determined to be the object area, upon which the extension of that object area ends. Then, from a next image subject to processing, another object area starts. Then, this processing is executed on all pixels around the target pixel T in four directions, up and down, left and right.

FIG. 5C is a diagram illustrating a state in which the processing described above has been done several times. The hatched pixels are pixels set as the same object area. As with the description done above, in this state, the pixels around the target pixel T in the four directions, up and down, left and right, are sequentially processed in the order of the pixels subject to processing U1, U2, U3, and U4. In the processing of the pixel subject to processing U2 below the target pixel T, a difference between the average color of all hatched pixels determined to be the same object area by the processing done so far and pixel subject to processing U2 is compared with the threshold value. As a result, if the difference is found to be equal to or lower than the threshold value, this pixel subject to processing U2 is determined as an object area. Then, as depicted in FIG. 5D and FIG. 5E, the seed pixel S is moved so as to execute the above-mentioned processing with all pixels being the target pixel T.

By the processing described above, object areas that are areas corresponding to the respective objects in an image are detected as depicted in FIG. 6. FIG. 6A depicts an input image to be processed and FIG. 6B depicts object areas detected from the input image. In FIG. 6B, object areas are partitioned by white lines in which areas corresponding to three objects, a person, a ground, and a background, are detected as object areas. The object area information indicative of these object areas is supplied to the depth information generation block 103 and the focus area detector 104.

The object areas are areas corresponding to the individual objects in an image. Therefore, the object area detection block 101 can also detect object areas by use of known edge detection processing.

Back to the description of the flowchart; next to step S13, the depth information generation block 103 generates depth information on the basis of the object area information and the defocus information in step S14.

The following describes how depth information is generated. As depicted in FIG. 7, first, an object area and the defocus information are superimposed on each other so as to relate an object area with the defocus information of a focus area superimposed on that object area for each object area. Then, for each object area, an average value of the defocus information of all focus areas superimposed on that object area is computed. The obtained average value of defocus information is one unit of depth information for that object area. Consequently, one unit of depth information can be obtained that corresponds to that object area for all object areas within an image. Thus, depth information is generated on the basis of the defocus information corresponding to distance. Depth information is information having a correlation not with the depth of an object main body but with the depth of each object area and the depth of each object area can be reflected by the average value of defocus information.

It should be noted that depth information is not restricted to the average value of the defocus information of two or more focus areas positioned within an object area. For example, an average value of the defocus information excluding the maximum and minimum values of the defocus information of the respective focus areas positioned inside an object area may be depth information. Excluding the maximum and minimum values can enhance noise immunity. Further, an intermediate value of the defocus information of the respective focus areas positioned inside an object area may be depth information. These values are equivalent to the value for each object area of the defocus information is the scope of claims herein.

Back to the description of the flowchart; next to step S14, the detection of an effective focus area is executed by the focus area detector 104 in step S15. As described above, object area information, depth information, and focus area positional information are supplied to the focus area detector 104. On the basis of these items of information, the focus area detector 104 executes the detection of an effective focus area.

Figure 8:
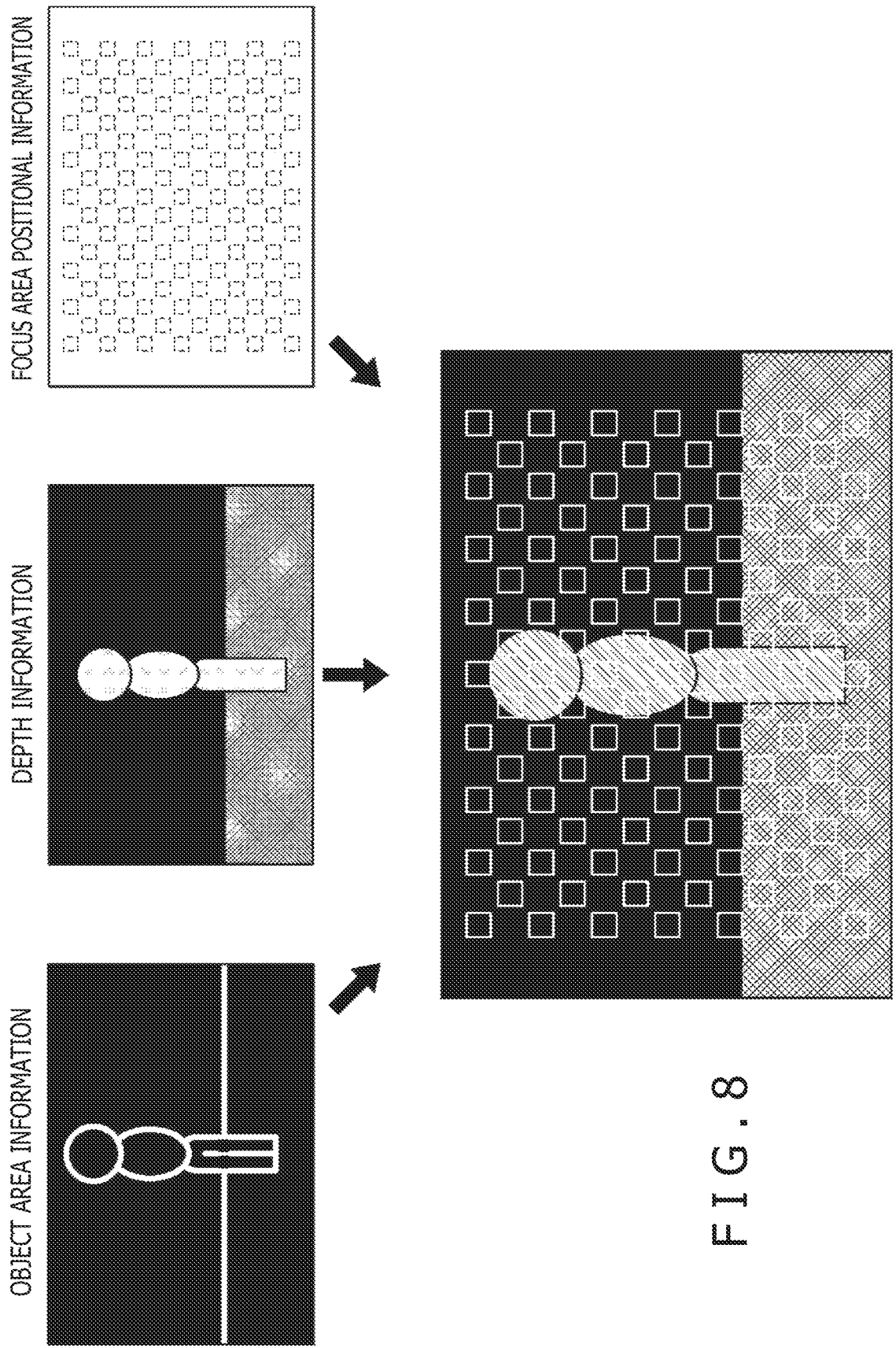
FIG. 8 is a diagram illustrating a focus area detection processing.

In the detection of an effective focus area, object area information, depth information, and focus area positional information are first superimposed on each other as depicted in FIG. 8 so as to relate the object areas and the depth information of each object area with each focus area. Next, for each of the focus areas, a degree of existence of two or more objects having different distances (hereafter referred to as far-near mix degree P) in each focus area is computed by use of the following equation (1). In equation (1), spd is indicative of the depth information of an object area in a focus area.

$$P = \frac{1}{n(n-1)} \sum_{i=1} \sum_{j=1} |spd_i - spd_j| \qquad \text{[Math 1]}$$

Then, the computed far-near mix degree P for each focus area is compared with a predetermined threshold value to as to sort the focus areas in accordance with the size of the far-near mix degree P.

Figure 9:
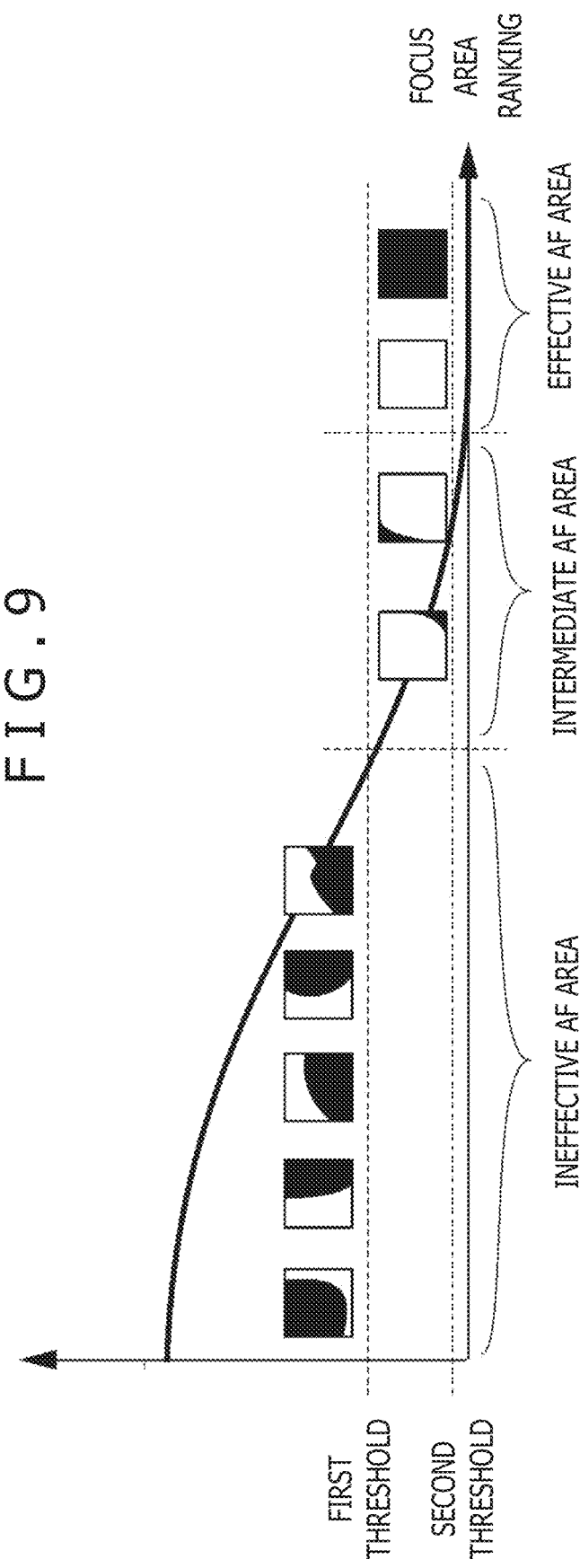
FIG. 9 is a diagram illustrating a focus area detection processing.

In the present embodiment, as depicted in FIG. 9, by comparing two threshold values, a first threshold value and a second threshold value smaller than the first threshold value, with the far-near mix degree P, the focus areas are sorted into three, equal to or higher than the first threshold value, equal to or lower than the second threshold value, and equal to or higher than the second threshold value and equal to or lower than the first threshold value, in accordance with the size of the far-near mix degree P.

If the far-near mix degree P is equal to or lower than the second threshold value, then it is determined that the far-near mix degree P is low, namely, no two or more objects having different distances are found in the focus area, so that this focus area is sorted as an effective focus area. Further, if the far-near mix degree P is equal to or higher than the first threshold value, it is determined that the far-near mix degree P is high, namely, there are two or more objects having different distances inside the focus area, so that this focus area is sorted as an ineffective focus area.

Further, if the far-near mix degree P is equal to or higher than the first threshold value and equal to or lower than the second threshold value, then this focus area is sorted an intermediate focus area that is neither an effective focus area nor an ineffective focus area.

It should be noted that the sorting of focus areas is not restricted to the three types described above. There may be two types of an effective focus area and an ineffective focus area other than an effective focus area. Alternatively, four or more types of focus areas may be provided by increasing the number of threshold values and in accordance with the size of far-near mix degree P.

Then, in step S16, the focus area detection information indicative of effective focus area, ineffective focus area, or intermediate focus area is outputted from the detection apparatus 100 to the outside. In the present embodiment, the focus area detection information is supplied to the AF control block 211 that executes AF control on the imaging apparatus 200.

As described above, the effective focus area detection processing is executed by the detection apparatus 100.

1-4. Use of Focus Area Detection Information

The following describes the use of the focus area detection information that is outputted from the detection apparatus 100 to the outside. In a first use mode, only the effective focus areas are used for the auto focus processing by the imaging apparatus 200 and the other than effective focus areas, namely, the ineffective focus areas and the intermediate focus areas are not used for auto focus processing. This is because of a problem that a high far-near mix degree P, namely, in the focus areas where there are two or more objects having different distances, an improper position such as a position approximately intermediate between two or more objects is focused, so that such focus areas are not used for auto focus processing due to a low reliability. In this case, only the effective focus areas are used for auto focus processing.

Consequently, since auto focus processing is executed by use of the defocus information in the focus areas where no two or more objects having different distances exist, the accuracy of auto focus processing can be enhanced. Further, focusing on such a position different from a position desired by the user as the approximate center between a far object and a near object can be suppressed.

Figure 10:
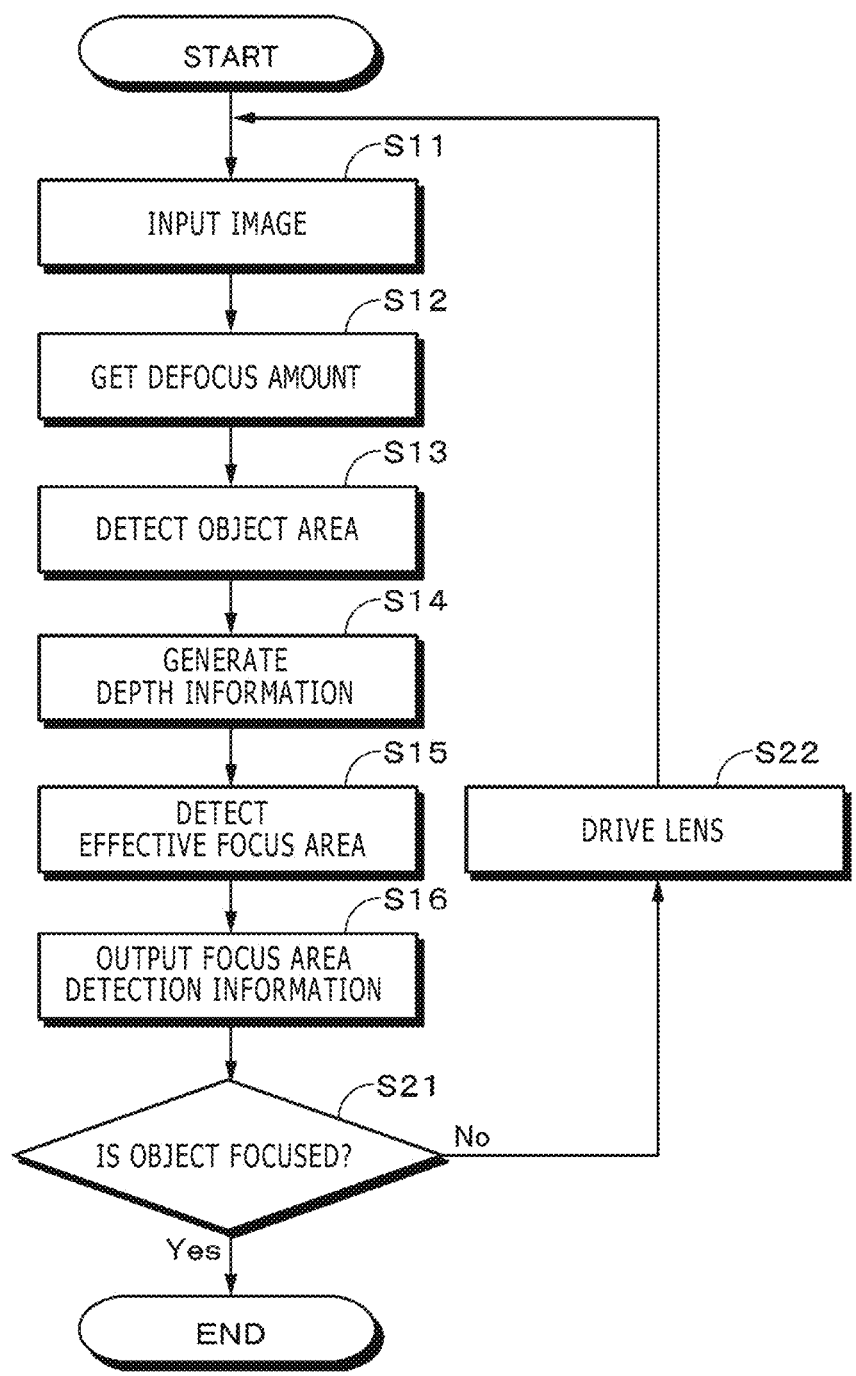
FIG. 10 is a flowchart indicative of a flow of auto focus processing using focus area detection information.

Referring to FIG. 10, there is depicted a flowchart indicative of the processing in which auto focus processing is executed by use of effective auto focus areas. Steps S11 through S16 are similar to those in the flowchart depicted in FIG. 4 and therefore the description of these steps will be skipped.

When focus area detection information is outputted to the AF control block 211 that is the outside of the system in step S16, the AF control block 211 determines in step S21 whether or not an object is focused. The focusing on an object can be determined on the basis of the defocus information obtained by the detection block 102.

If an object is not focused, then the procedure goes to step S22 in which, under the control of the AF control block 211, the lens driver 203 drives the lens of the optical imaging system 202 such that the object is focused. Then, the procedure returns to step S11; in steps S11 through S16, an effective focus area is detected again and the focus area detection information is outputted to the AF control block 211. Then, until the object is focused, the processing operations in steps S11 through S16 and steps S21 and S22 are repeated.

In a second use mode of focus area detection information, no ineffective focus areas are used for auto focus processing, the effective focus areas are used for auto focus processing, and the intermediate focus areas are used for auto focus processing by lowering the weight than that of the effective auto focus areas.

Figure 11:
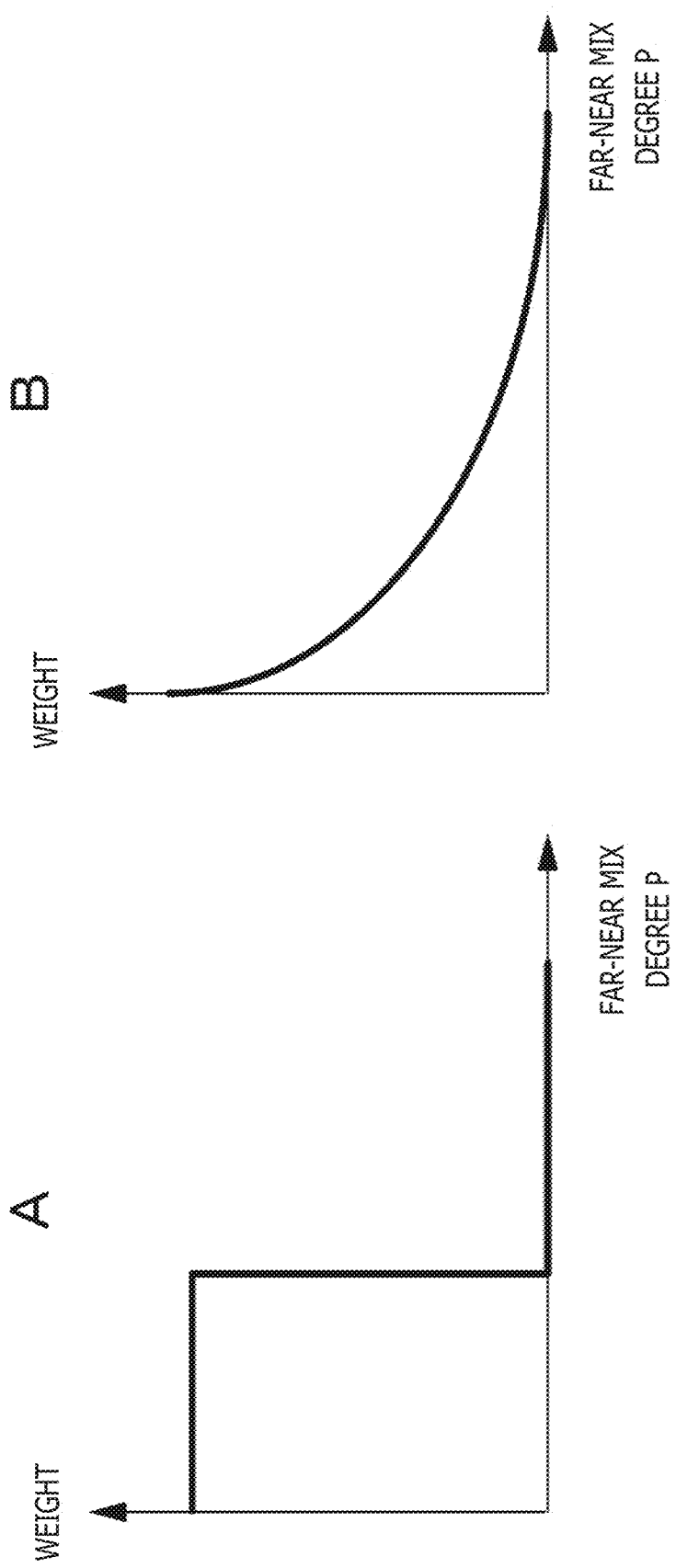
FIGS. 11A and 11B are graphs indicative of relations between far-near mix degree and weight.

For example, as depicted in a graph depicted in FIG. 11A, the properties are set such that, with the horizontal axis being far-near mix degree P and the vertical axis being weight, the weight increases as far-near mix degree P gets lower and the weight decreases as far-near mix degree P gets higher, thereby determining the weight in accordance with the properties. It should be noted that the properties for determining weight need not always be straight linear as depicted in FIG. 11A; for example, the properties may be curved as depicted in FIG. 11B.

A third use mode of focus area detection information is that the effective focus areas are used for auto focus processing, the ineffective focus areas are not used for auto focus processing, and the intermediate focus areas are subjected to focus area detection again.

If intermediate focus area detection is executed again, the detection block 102 changes the position and size of the focus area determined to be an intermediate focus area so as to execute the detection again. It may also be practicable that, in the position of a focus area sorted as an intermediate focus area, focus areas having a smaller size are densely rearranged for the detection. The focus area positional information indicative of the position and size of rearranged focus areas is supplied from the detection block 102 to the focus area detector 104. Then, the focus area detector 104 detects effective focus areas on the basis of the focus area positional information of these rearranged focus areas. This setup allows the focus areas sorted as intermediate focus areas to be made finer from which effective focus areas, ineffective focus areas, and intermediate focus areas can be detected, thereby detecting effective focus areas more finely.

1-5. Display Processing

Figure 12:
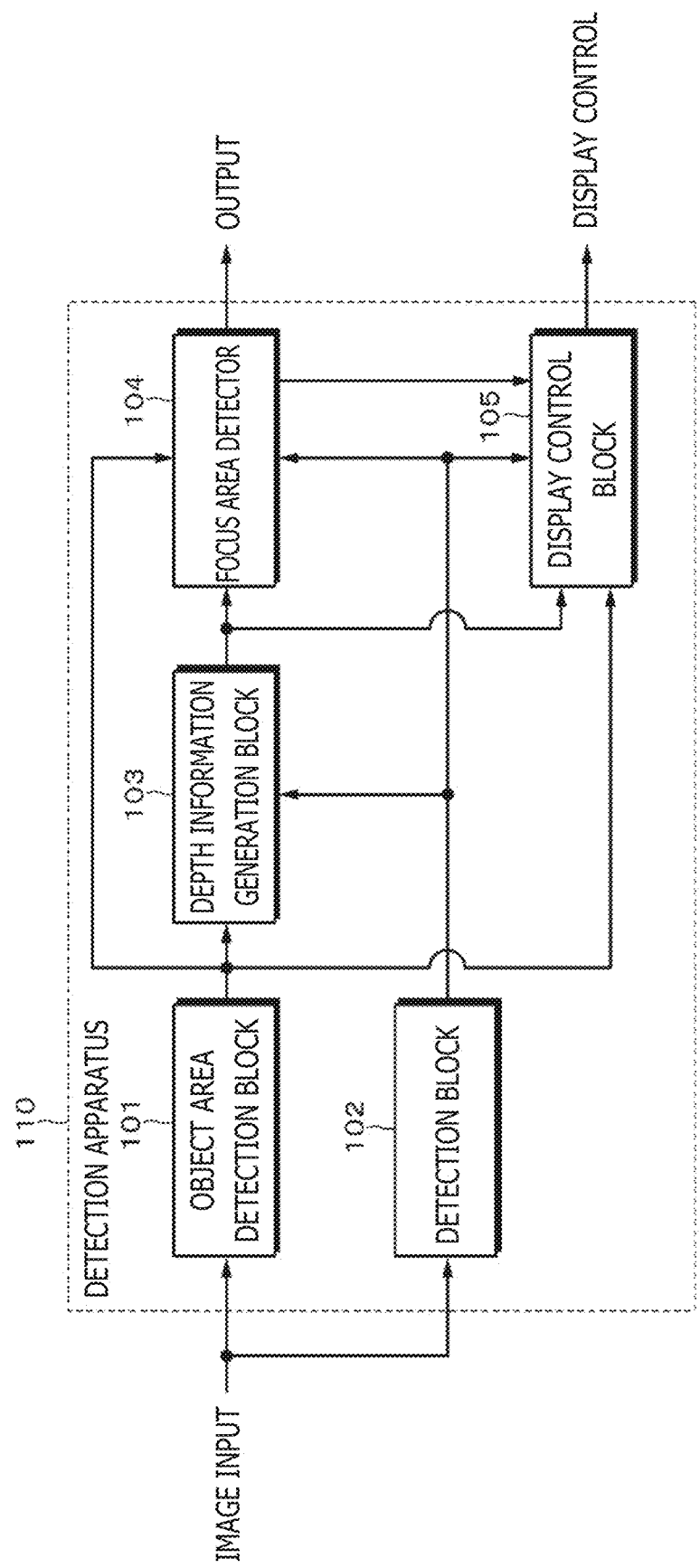
FIG. 12 is a block diagram illustrating a configuration of a detection apparatus having a display control block.

The following describes the display processing in a user interface that uses the focus area detection information and so on detected by the present technique. Referring to FIG. 12, there is depicted a block diagram illustrating a configuration of a detection apparatus 110 having the display control block 105. An object area detection block 101, a detection block 102, a depth information generation block 103, and a focus area detector 104 are similar to those which were described with reference to FIG. 1.

The display control block 105 controls displaying on the display block 210 of the imaging apparatus 200 on the basis of the information received from the object area detection block 101, the detection block 102, the depth information generation block 103, and the focus area detector 104. It should be noted that, in this control operation, a guidance may be done with a voice from a speaker (not depicted) along with the displaying in the display block 210 or instead of the displaying.

Figure 13:
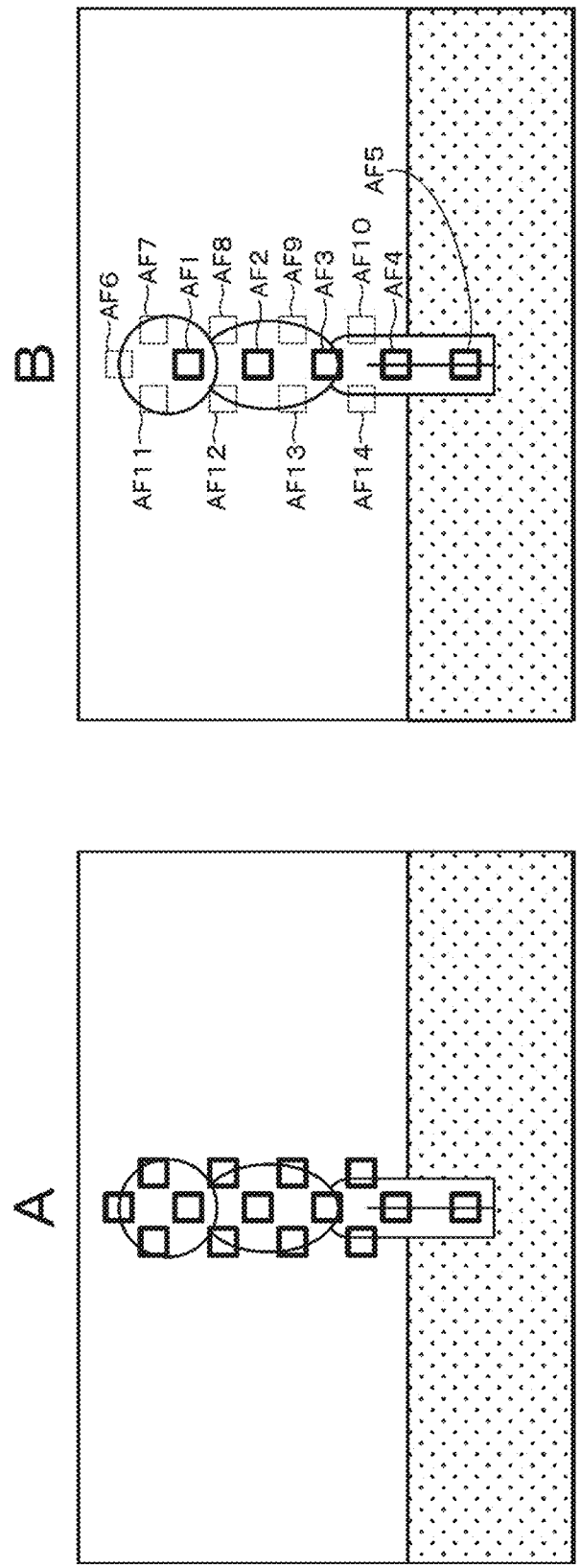
FIG. 13A is a comparison example of display mode and FIG. 13B is a first example of a display mode using focus area detection information.

The following describes a first mode of user interface displaying with reference to FIG. 13. In a comparison example depicted in FIG. 13A, a focused focus area is displayed in color. In the first mode, a frame indicative of a focus area focused on a monitoring image displayed on the display block 210 at the time of imaging by the imaging apparatus 200 is displayed in color. Further, a frame indicative of a focus area is displayed by changing the transparency degree of this frame in accordance with far-near mix degree P.

In the first mode in the present technique depicted in FIG. 13B, a total of 14 focus areas, that is, a focus area 1 through a focus area 14 are focused and are displayed in color. Further, the focus area 1 through the focus area 5 that are five focus areas arranged at the approximate center of an object H1 are low in far-near mix degree P and are displayed in a low frame transparency degree. In addition, the transparency degree of the frame is displayed high due to a high far-near mix degree P because a total of 9 focus areas, that is, the focus area 6 through the focus area 14, positioned at the vertex, the left side, and the right side of the center of the object H1 are superimposed on the boundaries of the object areas. By displaying the focus areas as described above, the user can easily understand that each effective focus area has no mixture of a far object and a near object and is highly accurately focused. In addition, the user can easily understand that a focus area having a high transparency degree has the mixture of a far object and a near object and therefore is low in the accuracy of focusing as compared with an effective focus area.

Realization of the user interface displaying as described above requires to supply focus area detection information and far-near mix degree information from the focus area detector 104 to the display control block 105 and information indicative of the final focused state in all focus areas from the AF control block 211 to the display control block 105. Then, the display control block 105 executes the processing of relating the focused state and far-near mix degree P of each focus area with the transparency degree of the frame of the focus areas so as to change the transparency degree of the focus area frame.

It should be noted that displaying a frame indicative of a focus area that is focused and low in far-near mix degree P low in the transparency degree is for displaying this focus area as highlighted. Therefore, in addition to coloring, any of the techniques such as thickening the frame indicative of a focus area more than the frames of other focus areas and thinning the frame indicative of a focus area not focused or high in far-near mix degree P may be employed.

The following describes a second mode of user interface displaying with reference to FIG. 14. In a comparison example depicted in FIG. 14A, only the focus areas superimposed on the object H1 that is a focused object are displayed. Further, in a comparison example depicted in FIG. 14B, only the focus areas superimposed on the object H2 that is a focused object are displayed.

On the other hand, in the example depicted in FIG. 14C indicative of the second mode of the user interface displaying in the present technique, only the effective focus areas are displayed and the object areas corresponding to the object H1 is which the effective focus areas are positioned are displayed in color. Further, in the example depicted in FIG. 14D, only the effective focus areas are displayed and the object areas corresponding to the object H2 in which the effective focus areas are positioned are displayed in color.

This setup allows the user to easily confirm which of the objects is focused in the monitoring image. It should be noted that, in highlighting the frame indicative of an effective focus area by coloring, the color to be given to the effective focus area and the color to be given to the object area may preferably different. This is because giving the same or like color makes it difficult to visually recognize the effective focus area displayed on the object area.

Realization of the user interface displaying as described above requires to supply the object area information from the object area detection block 101 to the display control block 105 and the information indicative of the final focused state in all focus areas from the AF control block 211 to the display control block 105. Then, the display control block 105 executes the processing of relating the focused state of each focus area with the object area so as to change the colors of the object area.

It should be noted that coloring a focused object area is to display the highlighted object area. Therefore, in addition to coloring, any of the methods of highlighting the focused object area such as thickening the contour of the focused object area, superimposing lines on to contour of object area, and thinning the contour of the unfocused object area may be employed.

The following describes a third mode of user interface displaying with reference to FIG. 15. In the third mode, an image indicative of depth information is superimposed on a monitoring image displayed on the display block 210. In a comparison example depicted in FIG. 15A, the image indicative of depth information is not displayed as superimposed. On the other hand, in the example depicted in FIG. 15B that is the third mode in the present technique, a depth information image R indicative of depth information is displayed as superimposed in a size smaller than that of a monitoring image at the upper right side of the monitoring image.

Since object areas and the depth information corresponding thereto are displayed, the depth information image R allows the user to confirm the positional relation of the object in the angle of view in the monitoring image according to this third mode and the type of depth information.

Realization of the user interface displaying as described above requires to supply the object area information from the object area detection block 101 to the display control block 105 and the depth information from the depth information generation block 103 to the display control block 105. The display control block 105 executes control of generating the depth information image R from the object areas and the depth information so as to display the generated image on the display block 210. It should be noted that the position of superimposed display is not restricted to the upper right side of the monitoring image. Further, the monitoring image and the image indicative of depth information may be displayed by partitioning the display block 210 into left and right sides or up and down sides, in addition to superimposed displaying.

The following describes a fourth mode of user interface displaying with reference to FIG. 16. In the fourth mode, in addition to the object areas focused in the monitoring image displayed on the display block 210, the object areas with depth information being approximately equal to these focused object areas are displayed in a highlighted manner. In order to display "the object areas with depth information being approximately equal" in a highlighted manner, an average value of the depth information of the focused object areas (the effective focus areas) is compared with the depth information of the object areas other than the focused object areas. If a result of the comparison (a difference value) is within a predetermined error, the focused object areas and the unfocused object areas are displayed in the same mode (or in the same color). For example, in FIG. 16B, the object areas corresponding to the upper part of a person are in focus and the object area corresponding to the lower part of the person is out of focus; in this case, if a difference value in the depth information between the object areas in the upper part and the object area in the lower part is within a predetermined error, then these object areas are displayed in the same color. Note that it is also practicable that the user sets a predetermined error of this difference value.

In the comparison example depicted in FIG. 16A, only the focused focus areas are displayed. On the other hand, in the example depicted in FIG. 16B indicative of the fourth mode in the present technique, an object H3 corresponding to the upper part of the person is focused. Therefore, the object H3 corresponding to the upper part of the person is displayed in color. Further, since the object H4 corresponding to the lower part of the person is approximately equal in depth information to the object H3 corresponding to the upper part of the person, the object H4 corresponding to the lower part of the person is also displayed in the color similar to that of the object H3.

Realization of the user interface displaying as described above requires to supply the object area information from the object area detection block 101 to the display control block 105, the formation indicative of a final focused state in all focus areas from the AF control block 211 of the imaging apparatus 200 to the display control block 105, and the depth information from the depth information generation block 103 to the display control block 105.

Then, the display control block 105 finds the focused object areas and, on the basis of the information supplied from the depth information generation block 103, obtains the depth information in the object areas. Next, the display control block 105 searches the image for object areas having the depth information approximately equal to the obtained depth information of the object areas. This search processing can be executed by referencing the information supplied from the depth information generation block 103. Then, the object areas having the approximately equal depth information are displayed on the display block 210 in a highlighted manner.

It should be noted that "the depth information is approximately equal" denotes that, if threshold values higher and lower than the depth information of the focused object areas are each set, the depth information of the other object areas subject to comparison is found within the range of these threshold values, for example.

It should also be noted that the above-mentioned first through fourth modes of user interface displaying may be used in combination rather than individually. For example, a combination of the first mode and the fourth mode may be used so as to display a low transparency degree of the frame indicative of a focused focus area and display an image indicative of depth information on a monitoring image in a superimposed manner.

It should be noted that the display control block 105 need not necessarily installed on the detection apparatus 100;

namely, the display control block 105 may be installed on such another apparatus having the detection apparatus 100 as the imaging apparatus 200, for example.

2. Variations

While the preferred embodiments of the present technique have been described using specific terms, such description is for illustrative purpose only, and it is to be understood by those skilled in the art that changes and variations may be made on the basis of a technical concept of the present technique.

It was described above that, in the above-mentioned embodiment, a focus area in which there are two or more objects having different distances is detected as an ineffective focus area and the other focus areas than the ineffective focus area are detected as effective focus areas. However, the detection apparatus 100 may be configured so as to detect only ineffective focus areas and output the ineffective focus area detection information to the outside.

The detection apparatus 100 may be applied not only to digital still cameras and digital single-lens reflex cameras but also to so-called lens style cameras cooperatively operating with smartphones, vehicle-mounted cameras, monitor cameras, night vision cameras, medical cameras such as X-ray cameras (X-ray photography) and gastro-cameras (fiber scopes), aerial cameras, and submerged cameras. The detection apparatus 100 is also applicable to various devices having camera functions, such as smartphones, mobile telephones, tablet terminals, personal computers, note personal computers, and portable game machines.

Focus area detection information is outputted from the detection apparatus 100 not only to imaging apparatuses but also to information processing apparatuses such as a personal computer and a smartphone.

Further, the present technique is applicable not only to still image taking but also to moving image taking.

The present technique can take the following configuration:

(1)
A detection apparatus including:
a detector configured to detect, on the basis of an object area that is an area corresponding to an object in an image, an effective focus area from a plurality of focus areas set to the image.

(2)
The detection apparatus according to (1) above, in which the effective focus area is detected on the basis of a value of the each object area of defocus information of the focus area.

(3)
The detection apparatus according (1) or (2) above, in which
the effective focus area is detected on the basis of depth information of the each object area of the focus area.

(4)
The detection apparatus according to (3) above, in which the depth information is computed on the basis of defocus information.

(5)
The detection apparatus according to (2) above, in which a degree of existence of a plurality of objects having different distances in the focus area is computed from a value for the each object area of the defocus information and the effective focus area is detected on the basis of the degree.

(6)
The detection apparatus according to any one of (1) through (5) above, in which
the effective focus area denotes, among the plurality of focus areas, a focus area in which there are no plurality of objects having different distances.

(7)
The detection apparatus according (5) above, in which
the effective focus area denotes, among the plurality of focus areas, a focus area in which a degree of mixture of a plurality of objects having different distances is equal to or lower than a predetermined threshold value.

(8)
The detection apparatus according (5) above, in which
the focus area is sorted on the basis of a degree of existence of a plurality of objects having different distances within the focus area.

(9)
The detection apparatus according to (8) above, in which
focus areas other than the effective focus area are sorted into as ineffective focus area and an intermediate focus area.

(10)
The detection apparatus according to any one of (1) through (9) above, in which
information indicative of the effective focus area is externally outputted.

(11)
The detection apparatus according to (9) above, in which
information indicative of the effective focus area, the ineffective focus area, and the intermediate focus area is externally outputted.

(12)
The detection apparatus according to (11) above, in which
only the effective focus area is used for auto focus processing in an imaging apparatus.

(13)
The detection apparatus according to any one of (1) through (12) above, in which
display control processing is a display block is executed on the basis of a result of detection of an effective focus area, an ineffective focus area, and an intermediate focus area.

(14)
The detection apparatus according to (13) above, in which
displaying of the focus area in the display block is changed according to the result of detection.

(15)
The detection apparatus according to (14) above, in which
a transparency degree of a display color of a frame of the focus in the display block is changed.

(16)
The detection apparatus according to (13), in which
displaying of a focused area among a plurality of areas corresponding to an object in an image displayed on the display block is changed.

(17)
The detection apparatus according to (16) above, in which
a color of a focused area among a plurality of areas corresponding to the object in the image displayed on the display block is changed.

(18)
The detection apparatus according to (13) above, in which
a monitoring image and information indicative of a value of the each object area of defocus information in the focus area are displayed on the display block.

(19)
The detection apparatus according to (13) above, in which, if a value of each object area of defocus information in the focus area is approximately equal between the focused object area and another object area, the focused object area and the another object area are displayed is a same mode.

(20)
A detection method including:
detecting, on the basis of an object area that is an area corresponding to an object in an image, an effective focus area from a plurality of focus areas set to the image.

(21)
A detection program for a computer to execute a detection method including:
detecting, on the basis of an object area that is an area corresponding to an object in an image, an effective focus area from a plurality of focus areas set to the image.

(22)
An imaging apparatus having a detector including:
an image pickup element configured to take an image; and
a detector configured to detect, on the basis of an object area that is an area corresponding to an object in an image to be taken with the image pickup element, an effective focus area from a plurality of focus areas arranged on the image.

REFERENCE SIGNS LIST

100 . . . Imaging apparatus
154 . . . Display control block
200 . . . Imaging apparatus

The invention claimed is:

1. A detection apparatus comprising:
detection circuitry configured to
receive an image including a plurality of objects,
set a predetermined array of focus areas to said image,
determine a first group of focus areas from said predetermined array of focus areas, each focus area of said first group with a corresponding area in said image having two or more different distances associated with two or more objects of said plurality of objects,
determine a remaining group of focus areas from said predetermined array of focus areas, said remaining group of focus areas excluding said first group of focus areas, and
determine an effective focus area from said remaining group of focus areas.

2. The detection apparatus according to claim 1, wherein said detection circuitry is further configured to
determine an average of defocus information for each object area of said plurality of objects in said image based on object area information and defocus information,
determine depth information based on said average of defocus information for said each object area, and
determine an object area that is an area corresponding to only one object of said plurality of objects based at least in part on said depth information.

3. The detection apparatus according to claim 2, wherein said detection circuitry is further configured to
superimpose said object area information, said depth information, and focus area positional information, and determine a degree of existence of any of said plurality of objects having different distances in said each focus area of said predetermined array of focus areas.

4. The detection apparatus according to claim 3, wherein said detection circuitry is further configured to determine a second object area that is a second area corresponding to said two or more objects of said plurality of objects based on said degree of existence of said any of said plurality of objects having said different distances in said each focus area of said predetermined array of focus areas equal to or lower than a predetermined threshold value, and
detect a second effective focus area from said predetermined array of focus areas based on said object area and said second object area.

5. The detection apparatus according to claim 3, wherein said detection circuitry is further configured to sort said each focus area of said predetermined array of focus areas based on said degree of existence of any of said plurality of objects having said different distances in said each focus area of said predetermined array of focus areas.

6. The detection apparatus according to claim 5, wherein focus areas other than said effective focus area are sorted into an ineffective focus area and an intermediate focus area.

7. The detection apparatus according to claim 6, wherein said detection circuitry is further configured to output information indicative of said effective focus area, said ineffective focus area, and said intermediate focus area to an external device.

8. The detection apparatus according to claim 7, wherein only said effective focus area is used for auto focus processing in said external device.

9. The detection apparatus according to claim 1, wherein said detection circuitry is further configured to output information indicative of said effective focus area to an external device.

10. The detection apparatus according to claim 1, wherein said predetermined array of focus areas includes
a first plurality of focus areas in odd rows and odd columns of said predetermined array of focus areas, said first plurality of focus areas are uniformly spaced from each other, and
a second plurality of focus areas in even rows and even columns of said predetermined array of focus areas, said second plurality of focus areas are uniformly spaced from each other, and each focus area of said second plurality of focus areas is uniformly spaced between four focus areas of said first plurality of focus areas.

11. A detection method comprising:
receiving, with detection circuitry, an image including a plurality of objects;
setting, with said detection circuitry, a predetermined array of focus areas to said image;
determining, with said detection circuitry, a first group of focus areas from said predetermined array of focus areas, each focus area of said first group with a corresponding area in said image having two or more different distances associated with two or more objects of said plurality of objects;
determining, with said detection circuitry, a remaining group of focus areas from said predetermined array of focus areas, said remaining group of focus areas excluding said first group of focus areas; and
determining, with said detection circuitry, an effective focus area from said remaining group of focus areas.

12. A non-transitory computer-readable medium comprising a detection program that, when executed by an electronic processor, causes said electronic processor to perform a set of operations comprising:
receiving an image including a plurality of objects;
setting a predetermined array of focus areas to said image;

determining a first group of focus areas from said predetermined array of focus areas, each focus area of said first group with a corresponding area in said image having two or more different distances associated with two or more objects of said plurality of objects;

determining a remaining group of focus areas from said predetermined array of focus areas, said remaining group of focus areas excluding said first group of focus areas; and determining an effective focus area from said remaining group of focus areas.

13. An imaging apparatus comprising:

an image pickup element configured to take an image; and detection circuitry configured to receive said image including a plurality of objects, set a predetermined array of focus areas to said image, determine a first group of focus areas from said predetermined array of focus areas, each focus area of said first group with a corresponding area in said image having two or more different distances associated with two or more objects of said plurality of objects, determine a remaining group of focus areas from said predetermined array of focus areas, said remaining group of focus areas excluding said first group of focus areas, and determine an effective focus area from said remaining group of focus areas.

14. The imaging apparatus according to claim 13, further comprising:

a display unit configured to perform display control processing based on a result of detection of said effective focus area, an ineffective focus area, and an intermediate focus area in said predetermined array of focus areas.

15. The imaging apparatus according to claim 14, wherein said display unit is further configured to change a displaying of each focus area of said predetermined array of focus areas according to said result of detection.

16. The imaging apparatus according to claim 15, wherein said display unit is further configured to change a transparency degree of a display color of a frame of said each focus area.

17. The imaging apparatus according to claim 14, wherein said display unit is further configured to change a displaying of a focused area among a plurality of areas corresponding to an object in an image displayed on said display unit.

18. The imaging apparatus according to claim 17, wherein said display unit is further configured to change a color of said focused area among said plurality of areas corresponding to said object in said image displayed on said display unit.

19. The imaging apparatus according to claim 14, wherein said display unit is further configured to display a monitoring image and information indicative of a value of said each object area of defocus information in said focus area.

20. The imaging apparatus according to claim 14, wherein, if a value of each object area of defocus information in said focus area is approximately equal between a focused object area and another object area, said focused object area and said another object area are displayed in a same mode.

* * * * *